United States Patent [19]

Marino

[11] Patent Number: 6,141,539
[45] Date of Patent: Oct. 31, 2000

[54] ISOLATION IMPROVEMENT CIRCUIT FOR A DUAL-POLARIZATION ANTENNA

[75] Inventor: Ronald A. Marino, Burlington, N.J.

[73] Assignee: Radio Frequency Systems Inc., Marlboro, N.J.

[21] Appl. No.: 09/238,837

[22] Filed: Jan. 27, 1999

[51] Int. Cl.$^7$ ........................................... H04B 1/44
[52] U.S. Cl. ................. 455/78; 455/24; 455/129; 343/700 MS
[58] Field of Search ................. 455/78, 63, 82, 455/296, 24, 303, 304, 129

[56] References Cited

U.S. PATENT DOCUMENTS

| | | | |
|---|---|---|---|
| 3,699,444 | 10/1972 | Ghose et al. | 325/21 |
| 4,480,255 | 10/1984 | Davidson | 343/844 |
| 4,728,960 | 3/1988 | Lo | 343/700 MS |
| 5,264,862 | 11/1993 | Kumpfbeck | 343/853 |
| 5,373,297 | 12/1994 | Briguglio | 342/15 |
| 5,444,864 | 8/1995 | Smith | 455/84 |
| 5,574,978 | 11/1996 | Talwar et al. | 455/63 |
| 5,647,379 | 7/1997 | Meltzer | 128/897 |
| 5,815,805 | 9/1998 | Crnkovic et al. | 455/78 |

*Primary Examiner*—Edward F. Urban
*Assistant Examiner*—Blane J. Jackson
*Attorney, Agent, or Firm*—Ware, Fressola, Van Der Sluys & Adolphson LLP

[57] ABSTRACT

An isolation improvement circuit for a dual-polarization antenna, the dual-polarization antenna consisting of both a transmitter and receiver antenna for simultaneously transmitting a transmission signal and receiving a receiver signal, in which the transmitter and receiver antennas are configured so as to be mutually orthogonal either by physical or electrical orientation in order to reduce how much of the transmitter signal is picked up by the receiver antenna. The isolation improvement circuit reduces the level of transmitter signal appearing at the output port of the receiver antenna by providing a time-delayed transmission signal that destructively interferes with the transmitter signal picked up by the receiver element. The isolation circuit includes deriving a canceling signal by coupling to the transmission signal at the input port, shifting the phase of the canceling signal and using a probe antenna to radiate the canceling signal so that the canceling signal is received by the receiver antenna element.

14 Claims, 3 Drawing Sheets

6,141,539

ISOLATION IMPROVEMENT CIRCUIT FOR A DUAL-POLARIZATION ANTENNA

TECHNICAL FIELD

The present invention pertains to transmitting and receiving antennas, and in particular, to isolating from each other antennas in an antenna system.

BACKGROUND OF THE INVENTION

One problem faced in designing an antenna system for simultaneously transmitting one signal while receiving another, is how to isolate the receiving sub-component so that it does not pick up the signal transmitted by the transmitting sub-component. Much isolation can be provided by transmitting and receiving at different polarizations. But even in such dual-polarized antenna systems, further isolation is often needed.

Referring to FIG. 1, an ordinary dual-polarized antenna system is shown, consisting of at least two mutually orthogonal elements 12, a transmitter antenna element 16 for transmitting a transmitter signal, and a receiver antenna element 17 for receiving, simultaneously, a receiver signal. The antenna system shown includes two arrays 10 and 11, each consisting of four parallel antenna elements, each array referred to as an antenna. The transmitter signal is provided through port #1 to the transmitter antenna elements 10, and the receiver signal is provided at port #2 after being picked up by the receiver antenna elements 11. Without isolation, even though the two antenna elements 16 and 17 are orthogonal (and all of the parallel antenna elements of array 10 are orthogonal to the parallel antenna elements of array 11), and even though the transmitter and receiver signals are at different frequencies, the receiver antenna array 11 picks up some of the signal from the transmitter antenna array 10.

To counter this interfering effect, or in other words, to isolate the receiver antenna elements from the transmitter antenna elements, the prior art often uses parasitic elements or walls of conducting material to provide isolation. This requires trial and error and is thus time-consuming and expensive. Further, the parasitic walls degrade antenna performance. Also, a particular configuration of parasitic elements or walls works for only one frequency band; a different arrangement must be used, in general, for any other frequency band, and will work for only one particular array geometry.

In U.S. Pat. No. 5,373,297 to Briguglio for a "Microwave Repeater with Broadband Active and/or Passive Isolation Control," there is disclosed a means of providing isolation in a microwave repeater by using a second receiving antenna, where the transmitting element transmits the signal received by the first receiver element, thereby continuing its propagation. The second receiving antenna is focused on the transmitting antenna to receive a portion of the signal radiated by the transmitting antenna; it is aligned so as to provide at its output the transmitted signal (only) with the same gain and phase appearing at the output of the first receiving antenna. The isolation means comprises an amplifier section coupled to the transmitting antenna and to the first receiving antenna, for amplifying and modulating the signal received by the first receiving antenna and then providing it to the transmitting antenna; a phase-shifter coupled to the second receiving antenna; and a power combiner having inputs coupled to the first receiving antenna and to the phase shifter, and having an output coupled to the amplifier section. The power combiner combines the signal picked up by the first receiving antenna with the signal received by the second receiving antenna and then phase-shifted by the phase shifter. This phase-shifted signal is a 180 degree phase-shifted copy of the same signal from the phase shifter. (Thus, in this, the undesired signal from the transmitting element appears at the output port of the first receiving element, and cancellation occurs later, in the combiner.)

There is also disclosed, in U.S. Pat. No. 4,480,255 to Davidson for a "Method For Achieving High Isolation Between Antenna Arrays," providing isolation by canceling unwanted signals so that a first antenna array, driven by a radio frequency generator, and a second antenna array, coupled, for example, to a radio frequency communication device, which could be a transceiver for simultaneously receiving and transmitting, can be located close to each other. In providing the isolation, the individual elements of each of the two antenna array are identified as belonging to either a first or a second part. The two parts of each transmitting array are driven in phase quadrature (relative to each other) and at equal power, and the two antenna arrays are spaced sufficiently close to each other so that radiation emitted by one array and received by the other array undergoes a canceling effect before reaching the radio frequency generator associated with the other array.

Both of these approaches to providing isolation are based on using destructive canceling techniques. However, U.S. Pat. No. 5,373,297 to Briguglio requires combining two received signals, one phase-shifted, after carefully aligning the second receiving antenna for providing the signal to be phase-shifted so as to provide for phase-shifting a signal with the correct gain and phase. And the approach used in U.S. Pat. No. 4,480,255 to Davidson constrains how the antenna arrays are spaced. What is needed is a way of providing isolation that is more consistent and requires less trial and error than using a secondary antenna aligned to provide the correct phase and gain for canceling, does not constrain how the antenna arrays are spaced.

SUMMARY OF THE INVENTION

Accordingly, it is an object of the present invention to provide an isolation circuit to improve the isolation between the two ports of a dual-polarized antenna system, and to provide such isolation consistently, with little trial and error, and in a way that does not constrain how the transmitting antenna and receiving antenna are spaced.

The present invention achieves the above object in an isolation circuit, for use in a dual polarized antenna system having a first port responsive to a transmission signal and attached to a transmitter antenna, for providing a transmitter signal, and also having a second port attached to a receiver antenna, the isolation circuit comprising: a coupling means for deriving a canceling signal from the transmission signal by coupling to the transmission signal at the first port, and for providing the canceling signal at the second port, the coupling means providing the canceling signal with an amplitude substantially equal to that of the transmitter signal arriving at the second port via the receiver antenna; and a conductor of a canceling length, for conducting the canceling signal from the first port to the second port, and for phase-shifting the canceling signal; wherein the canceling length is adjusted so that the canceling signal as provided at the second port is substantially 180° out of phase compared to the transmitter signal arriving at the second port via the receiver antenna.

In one aspect of the invention, the coupling means includes a first discrete coupler for coupling a portion of the transmission signal at the first port into the conductor of a canceling length, and a second discrete coupler for coupling the phase-shifted canceling signal out of the conductor of a canceling length into the receiver feedline at the second port, and further wherein each coupler includes a coupling length of the conductor of a canceling length and a coupling length of either the transmitter or receiver feedline, and holds the coupling length of the conductor in a fixed spatial relation to the coupling length of the feedline.

In another aspect of the invention, the coupling means includes a first, discrete coupler for coupling the transmission signal at the first port into the conductor of a canceling length, and a probe antenna for providing the phase-shifted canceling signal to the second port via the receiver antenna, wherein the first coupler includes a coupling length of the conductor of a canceling length and a coupling length of the transmitter feedline, and holds the coupling length of the conductor in a fixed spatial relation to the coupling length of feedline.

In one aspect of the invention, the coupling means includes a first coupler for coupling a portion of the transmission signal at the first port into the conductor of a canceling length, and a second coupler for coupling the phase-shifted canceling signal out of the conductor of a canceling length into the receiver feedline at the second port.

In another aspect of the invention, the coupling means includes a first coupler for coupling the transmission signal at the first port into the conductor of a canceling length, and a probe antenna for providing the phase-shifted canceling signal to the second port via the receiver antenna.

Compared to an isolation circuit according to U.S. Pat. No. 5,373,297 to Briguglio, the present invention, in the preferred embodiment (shown in the main figure below) would likely perform more consistently and would be implemented with less trial and error because it uses direct coupling, compared to using a secondary antenna aligned to provide the correct gain and phase.

Compared to the approach used in U.S. Pat. No. 4,480,255 to Davidson, the present invention is simpler (no driving the transmitting elements, identified as consisting of two groups of elements, in phase quadrature), and the present invention can be used without constraining how the transmitter and receiver antennas are spaced.

BRIEF DESCRIPTION OF THE DRAWINGS

The above and other features and advantages of the invention will become apparent from a consideration of the subsequent detailed description presented in connection with accompanying drawings, in which.

DETAILED DESCRIPTION

Figure 2:
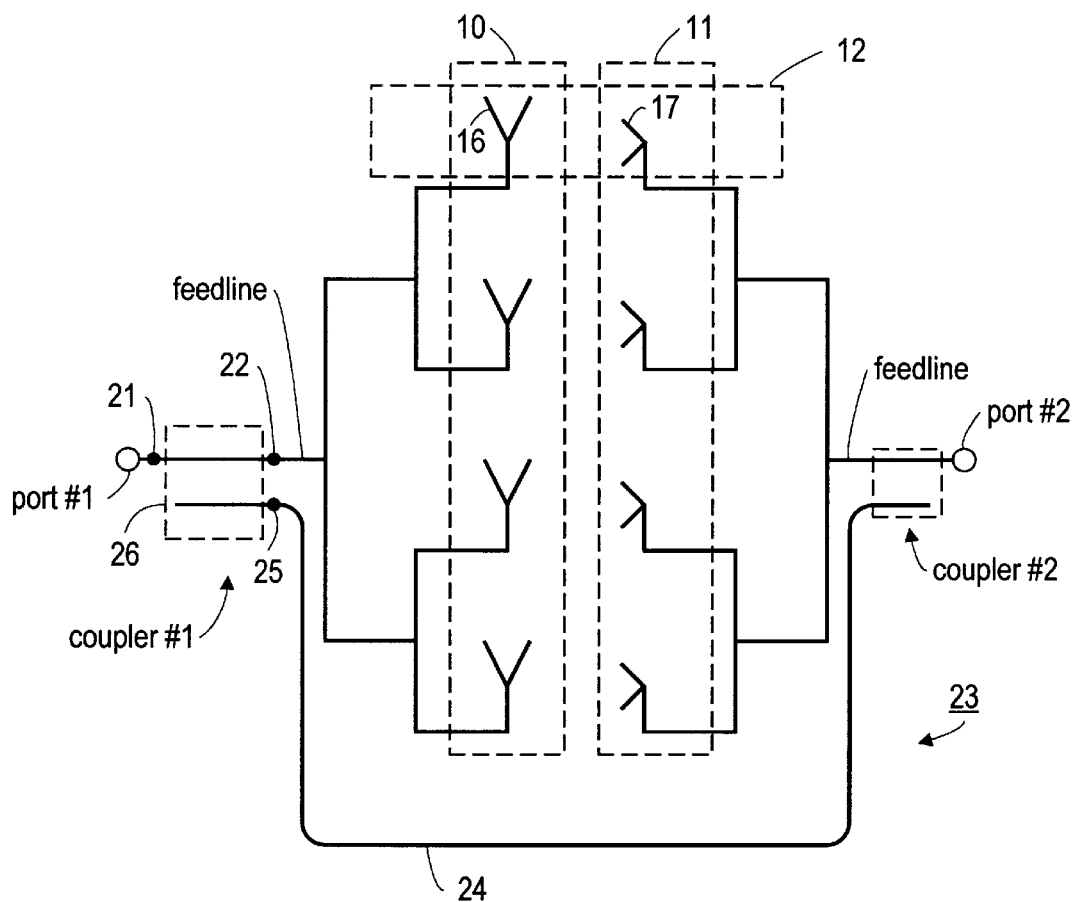
FIG. 2 is an antenna circuit using a two-discrete-coupler isolation improvement circuit according to the present invention.

Referring now to FIG. 2, an isolation improvement circuit for a dual-polarized antenna, consisting of parallel transmitter antenna elements 10 oriented orthogonally, in either a physical or electrical sense, to parallel receiver antenna elements 11, is shown in the preferred embodiment, as consisting of a coupler #1, responsive to a transmission signal provided to port #1, for providing to a coupler #2, through a conductor 24 of canceling length, a time-delayed transmission signal $S_{21,D}$. The canceling length of the conductor 24 is fixed so that the time-delayed transmission signal $S_{21,D}$ reaches port #2 out of phase compared to the portion $S_{21}$ of the transmitter signal arriving at port #2 through the receiver antenna by an amount equal to approximately one half of a wavelength of the carrier wave, i.e. so that $S_{21}$ and $S_{21,D}$ differ in phase by approximately 180 degrees.

Figure 1:
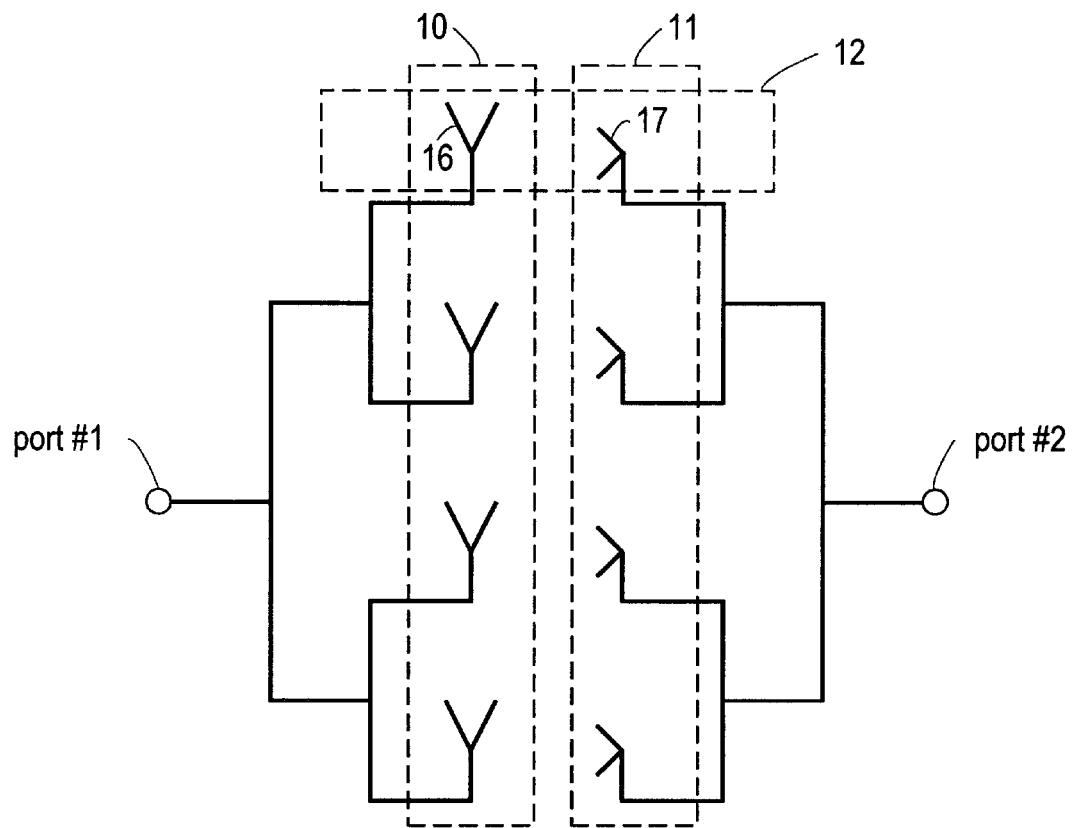
FIG. 1 is an ordinary antenna circuit, without the isolation improvement circuit of the present invention.
Figure 3:
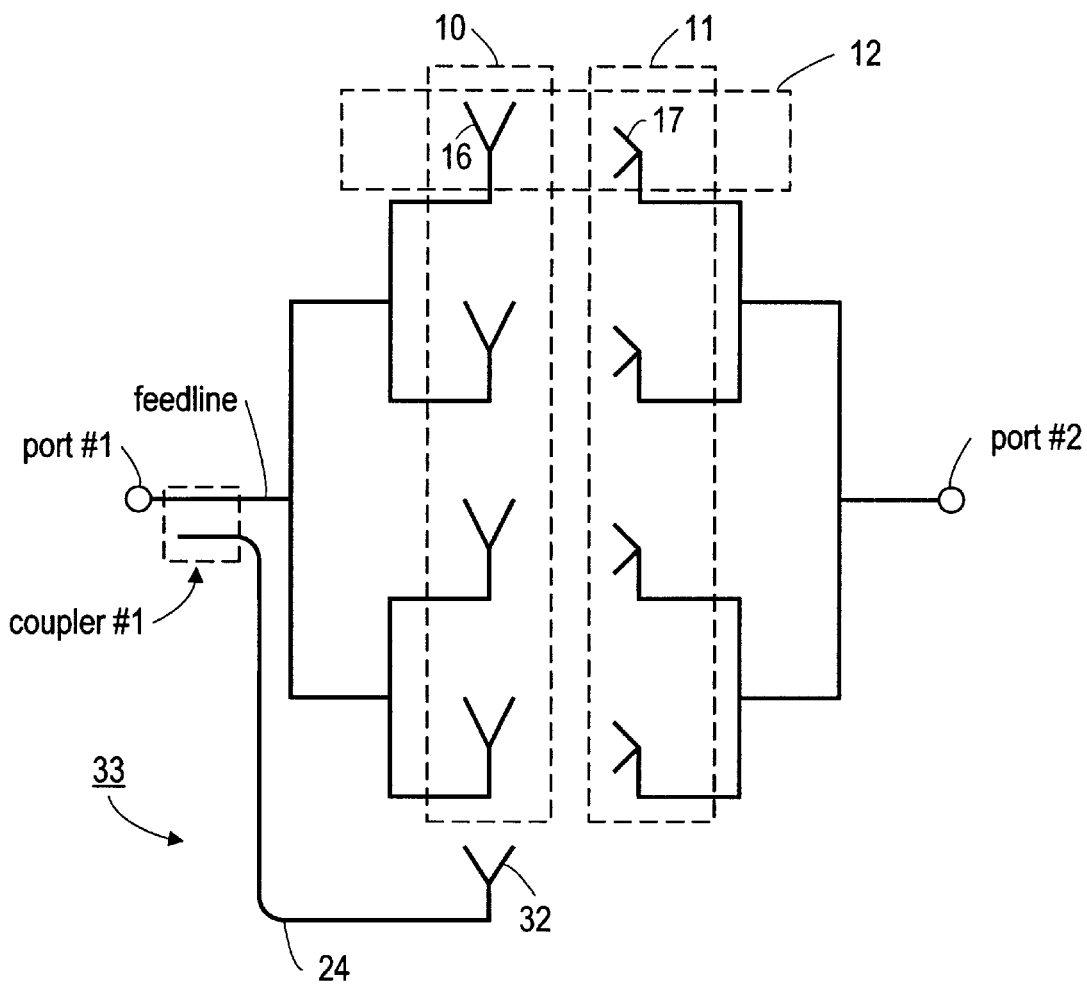
FIG. 3 is an antenna circuit using a single-discrete-coupler isolation improvement circuit, using a non-discrete, second coupler, according to the present invention.

The depictions in FIG. 2, and also FIG. 1 and 3, of the antenna elements 16 and 17 are intended only to illustrate that in the dual-polarized antenna the transmitter and receiver antenna elements are mutually orthogonal. Although the depictions suggest that the transmitter and receiver elements are physically orthogonal, the required orthogonality can also be provided electrically, using phased arrays, one for transmitting and one for receiving.

The two couplers #1 and #2 are selected to provide, in combination, the time-delayed transmission signal $S_{21,D}$ at approximately the same amplitude as that of $S_{21}$. Thus, port #2 receives a portion $S_{21}$ of both the undesired transmitter signal as well as a canceling signal, the time-delayed transmission signal $S_{21,D}$, approximately equal in magnitude to $S_2$ but 180 degrees out of phase. The canceling signal $S_{21,D}$ therefore substantially cancels the undesired signal $S_{21}$.

In implementing the isolation circuit of the present invention in the preferred embodiment, both the phase and amplitude of $S_{21}$ are measured before sizing the isolation circuit, i.e. before determining the canceling length of conductor 24, and before determining the coupling of couplers #1 and #2, in combination, needed to provide the proper canceling amplitude. Coupling is provided by placing a portion of the conductor 24 parallel to the feedline leading from port #1 or to port #2. Dashed rectangle 26 encloses the part of the conductor and part of the feedline where coupling occurs; the dashed rectangle is encloses what is called here the coupling length of the conductor at port #1 and the coupling length of the feedline at port #1.

The coupling length of the conductor at port #1 is arranged to be parallel to the coupling length of the feedline at port #1 and is held in fixed spatial relation to the feedline at port #1 by various means, depending on the particular application. In the case of, for example, adapting the present invention to a personal communications (PC) antenna system (in a frequency range of typically 1.85–1.99 GHz), where the feedline is often a microstrip feedline etched onto a printed circuit board, the coupling length of the conductor at port #1 is arranged parallel to the feedline at a standoff designed to provide the required gain, typically several or tens of thousandths of an inch. Typically, the coupling length of the conductor in this case would itself also be etched into the printed circuit board, thereby being held in fixed spatial relation to the coupling length of the feedline at port #1.

In some applications, it is preferable to use in-line couplers. Referring again to FIG. 2, such a coupler would include both the coupling length of the conductor at port #1 (the part within the dashed rectangle 18) as well as the coupling length of the feedline at port #1 (the part of the feedline within the same dashed rectangle 18). The dashed rectangle of FIG. 2 would, in the case of an in-line coupler, represent housing that encloses the conductor and feedline coupling lengths, and would structurally support the two coupling lengths in a fixed spatial relation. Both ends 21 and 22 of the feedline coupling length would then be soldered to the feedline, and the downstream end 25 of the conductor coupling length would be soldered to the rest of the conductor 24.

Preferably, the coupler, whether in-line or not, is a more narrowband coupler, i.e. particularly responsive only to the frequency of the carrier wave of the transmitter signal.

In the case of in-line couplers, whether the antenna system is for radiofrequency or microwave communication, the coupler units are, from the standpoint of the user, essentially the same. The in-line couplers are typically enclosed modules, usually rectangular in cross section, and as noted above support the coupling length of the feedline and coupling length of the conductor, within a housing, in a fixed spatial relation. If the antenna system is for microwave communication, inside the coupler there will be any one of various known coupling structures for coupling microwaves from one waveguide to another, the conductor of a canceling length being in this case a waveguide of one known sort or another (such as, for example, a transverse electric rectangular waveguide). If the antenna system is for radiofrequency communication, inside the coupling there will be any one of various known coupling structures for coupling radiofrequency signals from one conductor to another, the conductor of a canceling length being in this case one suitable for radiofrequency communication, such as coaxial cable. The coupling length of the conductor within the coupler itself, i.e. within the region where coupling occurs, as indicated for coupler #1 by the dashed rectangle 26, is not necessarily the same form of conductor as the conductor of a canceling length outside of the coupler, and similarly for the coupling length of the feedline and feedline outside of the coupler. For example, inside the coupler, the coupling length of conductor 24 may be a conducting metal etched onto a printed circuit board, but outside the coupler the conductor 24 may be coaxial cable.

The present invention is not intended to be restricted to using any particular kind of conductors for providing a time delay in the transmission signal. Any means of conducting the transmission signal so as to provide an adjustable time delay is intended to be within the scope of the present invention. For example, the conductor 24 can be coaxial cable, parallel wire, wire over ground, strip, or shielded strip transmission line, or any of various configurations of wave guides. Moreover, as would be apparent to one of ordinary skill in the art, the conductor 24 can include various capacitive or inductive elements that contribute to creating a time delay in the transmission signal provided to port #2. In some embodiments, in sizing the conductor 24 it is advantageous to adjust such capacitive and inductive elements, as well as the length of the conductor. In other embodiments, sizing the conductor 24 is accomplished purely by adjusting such capacitive and inductive elements.

It is not necessary to use two discrete couplers, as shown in FIG. 2. Other means of providing the transmission signal as a canceling signal to port #2 are also envisioned, besides using a second discrete coupler. For example, referring now to FIG. 3, instead of a two-discrete-coupler embodiment, the canceling signal extracted at port #1 by coupler #1 is provided to port #2 by transmitting it from a probe antenna 32 to the receiving antenna elements 11 that feed port #2, the probe antenna and receiving antenna elements 11 making up a second, non-discrete coupler. As in the preferred embodiment, a conductor of some canceling length is used to provide an appropriate phase delay so that when the signal provided by the probe antenna 32 arrives at port #2, it is substantially 180 degrees out of phase with $S_{21}$. In this embodiment, the gain of coupler #1 must be pre-set so that when the signal $S_{21,D}$ provided through the probe antenna 32 arrives at port #2, it is substantially equal in magnitude to $S_{21}$, the portion of the transmitter signal arriving at port #2.

It is to be understood that the above described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A dual-polarized antenna, comprising:
    a) a parallel transmitter antenna element 10 for providing a transmitter signal;
    b) a parallel receiver antenna element 11;
    c) a coupler electrically coupled to said parallel transmitter antenna element 10;
    d) a probe antenna; and
    e) a conductor of a canceling length coupled between the coupler and said probe antenna;

wherein said conductor of a canceling length is of a length such that a signal provided by the probe antenna arrives at the receiver antenna element substantially 180 degrees out of phase relative to the transmitter signal arriving at the receiver antenna element, and further wherein the probe antenna is adjusted so that the canceling signal arriving at the receiver antenna element is substantially equal in magnitude to the magnitude of the transmitter signal arriving at the receiver antenna element.

2. The dual-polarized antenna according to claim 1, wherein the coupler is a waveguide.

3. The dual-polarized antenna according to claim 1, wherein the coupler is an in-line coupler.

4. The dual-polarized antenna according to claim 1, wherein the coupler is a transverse electrical rectangular waveguide.

5. The dual-polarized antenna according to claim 1, wherein the coupler is a narrowband coupler.

6. The dual-polarized antenna according to claim 1, wherein said conductor of a canceling length is held in fixed spatial relation to a feedline.

7. The dual-polarized antenna according to claim 1, wherein said conductor of a canceling length is a strip transmission line.

8. The dual-polarized antenna according to claim 1, wherein said conductor of a canceling length is a coaxial cable.

9. The dual-polarized antenna according to claim 1, wherein said conductor of a canceling length is a parallel wire.

10. The dual-polarized antenna according to claim 1, wherein said conductor of a canceling length is a shielded strip transmission line.

11. The dual-polarized antenna according to claim 1, wherein said conductor of a canceling length is a wire over ground.

12. The dual-polarized antenna according to claim 1, wherein said conductor of a canceling length is a capacitive element.

13. The dual-polarized antenna according to claim 1, wherein said conductor of a canceling length is an inductive element.

14. A method of improving isolation between a first and a second port of a dual-polarized antenna, the first port providing a transmission signal to a transmitter antenna element and the second port leading from a receiver antenna element, the transmitter element providing a transmitter signal corresponding to the transmission signal, the method comprising the steps of:

a) deriving a canceling signal by coupling to the transmission signal at the first port;

b) shifting the phase of the canceling signal; and c) using a probe antenna to radiate the canceling signal so that the canceling signal is received by the receiver antenna element;

wherein the step of shifting the phase of the canceling signal results in the canceling signal arriving at the receiver antenna element substantially 180 degrees out of phase relative to the transmitter signal arriving at the receiver antenna element, and further wherein the step of radiating the canceling signal using a probe antenna is performed in such a way that the canceling signal arriving at the receiver antenna element is substantially equal in magnitude to the magnitude of the transmitter signal arriving at the receiver antenna element.

* * * * *